US010115167B2

(12) United States Patent
Shen et al.

(10) Patent No.: US 10,115,167 B2
(45) Date of Patent: Oct. 30, 2018

(54) SYSTEM AND METHOD FOR IDENTIFYING KEY TARGETS IN A SOCIAL NETWORK BY HEURISTICALLY APPROXIMATING INFLUENCE

(71) Applicant: Palo Alto Research Center Incorporated, Palo Alto, CA (US)

(72) Inventors: Jianqiang Shen, Santa Clara, CA (US); Oliver Brdiczka, Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 1147 days.

(21) Appl. No.: 14/109,781

(22) Filed: Dec. 17, 2013

(65) Prior Publication Data

US 2015/0170295 A1 Jun. 18, 2015

(51) Int. Cl.
*G06Q 10/00* (2012.01)
*G06Q 50/00* (2012.01)

(52) U.S. Cl.
CPC .................................... *G06Q 50/01* (2013.01)

(58) Field of Classification Search
CPC combination set(s) only.
See application file for complete search history.

(56) References Cited

U.S. PATENT DOCUMENTS

2008/0070209 A1* 3/2008 Zhuang .................. G06Q 10/10 434/236
2010/0080412 A1* 4/2010 Zafar ..................... G06Q 10/10 382/100
2010/0198757 A1* 8/2010 Cheng .................... G06Q 10/06 706/12
2012/0158476 A1* 6/2012 Neystadt ................ G06Q 50/01 705/14.16
2012/0209920 A1* 8/2012 Neystadt ........... G06F 17/30867 709/205
2012/0215893 A1* 8/2012 Bisdikian .............. G06F 9/5011 709/223

OTHER PUBLICATIONS

Goldbeck, Jennifer, Cristina Robles and Karen Turner. "Predicting Personality with Social Media". CHI 2011, May 7-12, 2011, Vancouver, BC, Canada. ACM 978-1-4503-0268-5/11/05.*

* cited by examiner

*Primary Examiner* — Gabrielle A McCormick
(74) *Attorney, Agent, or Firm* — Shun Yao; Park, Vaughan, Fleming & Dowler LLP

(57) ABSTRACT

One embodiment of the present invention provides a system for selecting a set of nodes to maximize information spreading. During operation, the system receives a budget constraint and a population sample, constructs a social network associated with the population sample, analyzes a network graph associated with the social network to obtain structural information associated with a node within the social network, estimates characteristics associated with the node, and selects the set of nodes that maximizes the information spreading under the budget constraint based on the structural information and the characteristics associated with the node.

18 Claims, 5 Drawing Sheets

300

SYSTEM AND METHOD FOR IDENTIFYING KEY TARGETS IN A SOCIAL NETWORK BY HEURISTICALLY APPROXIMATING INFLUENCE

STATEMENT OF GOVERNMENT-FUNDED RESEARCH

This invention was made with U.S. government support under Contract No. W911NF-11-C-0216 (3729) awarded by the Army Research Office. The U.S. government has certain rights in this invention.

BACKGROUND

Field

This disclosure is generally related to cost-effective message delivery to a population group. More specifically, this disclosure is related to a budget-constrained message-delivery system that identifies a set of key persons who are influential to other people within the population, and delivers messages to the identified persons.

Related Art

Social networks are always important in information spreading. For example, a person viewing a news story may spread such a story to his family members, neighbors, colleagues, etc. With the popularity of social networking services, such as Facebook, Twitter, Google+, to name a few, an individual's social network has expanded far beyond the normal family-work-geographic domain, thus making social networks even more important in information spreading. Modern marketing and political campaigns, for example, have been using social networking sites to spread their messages.

Many commercial message-delivering entities, such as advertising agencies, charge a fee for each message-delivery occurrence. For example, for web-based advertising, a fee might be charged for each click-through incident. Hence, if the budget for delivering a message is limited, it is important to deliver that message only to individuals with great influence on other people. Once these influential individuals accept the message, they can spread the message to other people. However, given a set of people, such as people within a social network or a large enterprise, identifying those influential individuals can be challenging.

SUMMARY

One embodiment of the present invention provides a system for selecting a set of nodes to maximize information spreading. During operation, the system receives a budget constraint and a population sample, constructs a social network associated with the population sample, analyzes a network graph associated with the social network to obtain structural information associated with a node within the social network, estimates characteristics associated with the node, and selects the set of nodes that maximizes the information spreading under the budget constraint based on the structural information and the characteristics associated with the node.

In a variation on this embodiment, the structural information associated with the node includes centrality measures and an outreach ability, and the centrality measures include one or more of: a degree-centrality measure, a betweenness-centrality measure, and a closeness-centrality measure.

In a variation on this embodiment, the characteristics associated with the node include Big Five personality traits associated with an individual corresponding to the node.

In a variation on this embodiment, selecting the set of nodes involves: estimating an influence level associated with an initial node set and performing a greedy selection process to identify a node that maximizes a marginal gain of influence level over the initial node set.

In a further variation, estimating the influence level associated with the initial node set involves: calculating a weighted sum of aggregated centrality measures associated with nodes within the initial node set, calculating an outreach ability of the initial node set, and calculating a weighted sum of aggregated characteristics associated with nodes within the initial node set.

In a further variation, estimating the influence level associated with the initial node set involves applying a machine-learning technique.

In a further variation on this embodiment, performing the greedy selection process involves determining whether a node number of the selected set exceeds a threshold determined by the budget constraint. The budget constraint includes one of: an amount of money, and a number of person hours.

DETAILED DESCRIPTION

Figure 1:
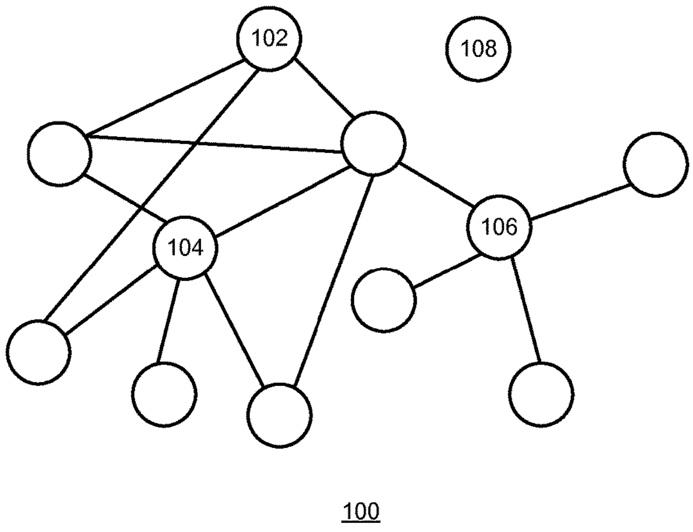
FIG. 1 presents a diagram illustrating an exemplary network graph representing a social network.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a solution for delivering messages to people within a social network in a cost-effective manner. More specifically, embodiments of the present invention provide a method and a system that is capable of selecting key individuals (or nodes) within the social network based on estimated influence levels of those individuals. During operation, a heuristic approach is used to approximate the influence level of one or more nodes within a social network based on the structural information of the nodes within the network, the outreach ability of the nodes, and the estimated characteristics of each node. In some embodiments, techniques for identifying key nodes within a social network can also be used for security analysis of a large organization.

Social Network-Based Information Spreading

When spreading information to people within a social network, it is important to identify key individuals or nodes within the social network. Information spreading can be maximized by targeting those key nodes. For example, when a merchant company is trying to sell a product, if they can persuade certain influential individuals within a social network to adopt their product, other people who are under the influence of those individuals may follow suit and adopt the product as well.

Two diffusion models have been used to study the spreading of influence within a social network, including a liner threshold model and an independent cascade model.

In the linear threshold model, a node v is influenced by each neighbor w according to a weight $b_{v,w}$, such that $$\sum_{w\,neighbor\ of\ v} b_{v,w} \leq 1.$$

The dynamics of the process then proceed as follows. Each node v chooses a threshold $\theta_v$ uniformly at random from the interval [0,1]; this represents the weighted function of v's neighbor that must become active (such as adopting a certain product or accepting a certain idea) in order for v to become active. Given a random choice of thresholds, and an initial set of active nodes A (with all other nodes inactive), the diffusion process unfolds deterministically in discrete steps: in step t, all nodes that were active in step t−1 remain active, and any node v for which the total weight of its active neighbors is at least $$\theta_v\left(\sum_{w\,neighbor\ of\ v} b_{v,w} \geq \theta_v\right)$$

is activated. Here, the thresholds $\theta_v$ represent the different latent tendencies of nodes to adopt the product or message when their neighbors do. The threshold values are randomly selected because such knowledge is not readily available. The random, uniform selection in fact averages over all possible threshold values for all the nodes.

In the independent cascade model, the process again starts with an initial set of active nodes A, and then unfolds in discrete steps according to the following randomized rule. When node v first becomes active in step t, it is given a single chance to activate each currently inactive neighbor w; it succeeds with a probability $p_{v,w}$ (a parameter of the system) independently of the history thus far. If node v succeeds, then node w will become active in step t+1; but whether or not node v succeeds, it cannot make any further attempts to activate node w in subsequent rounds. The process runs until no more activation is possible.

In both the aforementioned models (and other possible diffusion models), the goal is to select an initial set of active nodes in order to maximize the number of active nodes in the end. However, this has been proved to be an NP-complete problem, and finding the optimal solution is intractable.

Various approaches have been used to find sub-optimal solutions, such as using greedy hill-climbing strategies. One strategy uses the node characteristics (as represented in a network graph) in the network as heuristics for finding the sub-optimal solution. For example, the strategy starts with sorting nodes based on their network characteristics, such as a degree-centrality measure, a betweenness-centrality measure, and a closeness-centrality measure. The degree-centrality measure for a node is defined as the number of edges attached to the node. The degree-centrality measure is a measure of network activity associated with a node, and can be interpreted in terms of the immediate risk of the node for catching whatever is flowing through the network, such as viruses or information. The betweenness-centrality measure quantifies the number of times a node acts as a bridge along the shortest path between two other nodes. In general, nodes that occur on many shortest paths between other nodes have a higher betweenness-centrality level than those that do not. The betweenness-centrality measure of a node positively correlates with how much influence the node has over what flows in the network. Nodes with high betweenness have greater influence over what flows in the network. The closeness-centrality measure is a measure of how close a node is to other nodes in the network. Nodes that have shorter geodesic distances to other nodes in the network graph have higher closeness-centrality levels, and hence, they are in an excellent position to monitor the information flow in the network. Once the nodes are sorted, the strategy continues by picking up the top n nodes with the highest overall centrality levels. However, such an approach has no guarantee on the performance in the worst-case scenario.

A different strategy is to use a submodular function to perform a greedy search for n nodes. Note that a function is submodular if it satisfies a natural "diminishing returns" property, meaning the marginal gain from adding an element to a set S is at least as high as the marginal gain from adding the same element to a superset of S. The influence of a set of nodes A, which is measured by the expected number of active nodes at the end of the process (based either on the linear threshold model or the independent cascade model), given that A is the initial active set, is a submodular function. The strategy acquires the n nodes by selecting one node at a time, each time choosing a node that provides the largest marginal increase to the influence level. Although there is a performance guarantees of slightly better than 63%, this approach has a number of limitations. First, in order to choose a node that provides the largest marginal increase to the influence level based on either the linear threshold model or the independent cascade model, one needs to estimate certain network parameters. Applying the linear threshold model requires knowledge of a node's influence thresholds and influence weights with its neighbors, and applying the independent cascade model requires knowledge of the probability that a node successfully activates its neighbor. In practice, accurate evaluations of these parameters can be difficult to obtain. Second, obtaining the influence level of a node set can be costly. People usually have to sample the influence process in order to evaluate the influence level. For a real-world social network, which is usually quite large, the process of selecting a large initial set can be computationally expensive.

To solve such problems, embodiments of the present invention provide a system for estimating the influence level of a node set. More specifically, in some embodiments, the system estimates the influence level based on network characteristics of the nodes and estimated characteristics of individuals corresponding to the nodes.

FIG. 1 presents a diagram illustrating an exemplary network graph representing a social network. In FIG. 1, social network 100 includes a plurality of nodes, such as nodes 102, 104, 106, and 108. Each node corresponds to an individual and each edge or link corresponds to a close relationship between two persons. In FIG. 1, some nodes are connected to one or more other nodes within social network 100, indicating the corresponding interpersonal relationships among individuals. For example, node 102 is connected to three other nodes, node 104 is connected to five other nodes, and node 106 is connected to four other nodes. Some nodes are orphan nodes that do not have a connection to any other node. For example, node 108 is an orphan node that does not have a connection to any other node, indicating that node 108 represents a solitary individual.

Given a population sample, such as workers of a company, people living in a city, participants of an online game, or fans of a superstar, various approaches can be used to construct the social network. In certain cases, the social network may be a default setting. For example, if every individual in the population sample is a user of a social networking site (such as Facebook), constructing social network 100 can be a simple process of retrieving the friend list of each user. In other cases, constructing the social network may require additional data collecting and analyzing efforts.

In an example of online gaming, the system may apply certain heuristic criteria when constructing a social network. For example, if two users (as expressed by game characters) often play for the same guild at the same time, the system may add a line between these two users. In some embodiments, the system can use email communication and online chatting history to construct a social network. For example, if the emails exchanged or occurrences of online chatting between two individuals exceed a predetermined threshold, the system can add a link between these two individuals.

In addition to direct communication, the system can also use physical proximity to construct a social network. For example, if two or more individuals work for the same company, live within a certain distance of each other, or visit the same facility (which can be a restaurant, a gym, or a daycare center) frequently, the system can add links among these individuals.

Once the social network is constructed for the population sample, the system is capable of obtaining structural information for a node or a set of nodes based on the network graph. In some embodiments, the structural information for a set of nodes includes graph characteristics, such as a degree-centrality measure, a betweenness-centrality measure, and a closeness-centrality measure, associated with each node of the set of nodes. In the example shown in FIG. 1, one can see that node 104 has the highest centrality levels (including the degree-, betweenness-, and closeness-centrality levels) among all nodes, whereas node 108 has the lowest centrality levels. Such structural information is important for estimating influence levels.

Moreover, the system estimates the outreach ability of the set of nodes, which is defined as the number of nodes that are directly linked by nodes in the set but are not in the set. In some embodiments, the system calculates the outreach ability of a node set A by identifying nodes within the network that have at least one edge linking a node within the set A, removing nodes that belong to set A from the identified group of nodes, and then counting the number of nodes left in the identified group of nodes. The outreach ability is also an important factor for influence.

Another type of information that plays an important role in estimating the influence level is the estimated characteristics of each node. It has been shown that by estimating a person's personality, one can estimate how much influence that person may have on other people. In general, extraverted, outgoing people tend to influence their peers more than the introverted type.

A person's characteristics typically include multiple aspects. Based on the Big Five model, human personality can include five dimensions: extraversion, agreeableness, neuroticism, conscientiousness, and openness to experience. Extraversion is characterized by breadth of activities (as opposed to depth), surgency from external activity/situations, and energy creation from external means. People measuring higher on the extraversion scale tend to be more outgoing, gregarious and energetic, while people with lower extraversion scores tend to be more reserved, shy, and quiet. Agreeableness reflects individual differences in general concern for social harmony. Agreeable individuals value getting along with others. They are generally friendly, caring, and cooperative, whereas disagreeable people may be suspicious, antagonistic, and competitive toward others. Neuroticism is the tendency to experience negative emotions, such as anger, anxiety, or depression. It is sometimes called emotional instability. Individuals with high neuroticism scores tend to be more nervous, sensitive, and vulnerable, whereas individuals with low neuroticism scores tend to be calm, emotionally stable, and free from persistent negative feelings. Conscientiousness is a tendency to show self-discipline, act dutifully, and aim for achievement against measures of outside expectations. It is related to the way in which people control, regulate, and direct their impulses. Individuals with high conscientiousness scores often are more organized, self-disciplined, and dutiful, whereas individuals with lower scores are more careless, spontaneous, and easygoing. Openness to experience is a general appreciation for art, emotion, adventure, unusual ideas, imagination, curiosity, and a variety of experience. People who are open to experience are intellectually curious, appreciative of art, and sensitive to beauty, as well as being imaginative with a tendency toward abstract thought. On the other hand, people who are less open can have more conventional and traditional interests, and may be more down-to-earth.

Using the Big Five model, one may express an individual's personality using a five-dimension real-value vector. For example, using a scale of 1-100, an individual's personality may be expressed as: {extraversion=80, agreeableness=90, neuroticism=25, conscientiousness=75, openness=55}. Not all aspects of the person's personality play a role in influencing others. In some embodiments, only a subset of aspects of an individual's personality or a subset of dimensions of the personality vector is used for estimating an individual's influence level. For example, one may use the extraversion dimension and the openness dimension of the personality vector to estimate the influence level of an individual.

Once sufficient information is collected, the system can estimate the influence level of a node set using the collected information, including but not limited to: the structural information, the outreach ability, and the characteristics of each node within the node set. In some embodiments, the system can construct high-level aggregates based on collected low-level information. For example, based on the obtained degree-centrality level for each node in a set of nodes, the system can compute a histogram of degree-centrality or an average degree-centrality for the set. Similarly, the system can compute a histogram of betweenness-centrality for the node set or an average betweenness-centrality for the set; or the system can compute the extraversion histogram or average extraversion scores for a set. The system can then approximate the influence of the node set using the constructed high-level aggregates. In some embodiments, the system may use a formula to approximate the influence level of a set of nodes. The formula can be expressed as:

$$w_1\text{*AverageBetweenness}+w_2\text{*AverageCloseness}+w_3\text{*OutreachAbility}+w_4\text{*AverageExtraversion}+w_5\text{*AverageOpenness} \quad (1)$$

In formula (1), $w_1, \ldots, w_5$ are weight functions, and the AverageBetweenness and AverageCloseness values are the average betweenness- and closeness-centrality levels of all nodes within the set, respectively. The OutreachAbility is the calculated outreach ability of the node set. The AverageExtraversion and AverageOpenness values are average extraversion and openness scores of all nodes in the set, respectively. Note that different formulas may be used to estimate the influence level. In some embodiments, the influence-estimation formula may be derived based on associations between node characteristics and the information content. Depending on the content, individuals with certain characteristics may be more receptive to information and are more willing to spread such information to others. For example, if the information to be spread includes political campaign messages, individuals with political views that are in line with these campaign messages are more likely to be receptive to the messages and to spread the messages to others than those with opposing political views.

Figure 2:
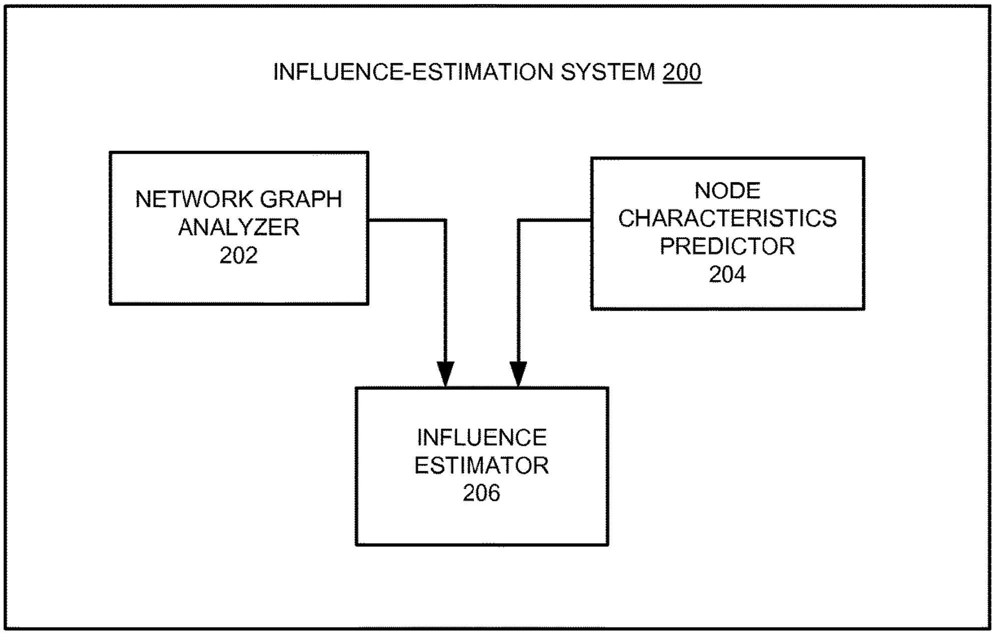
FIG. 2 presents a diagram illustrating an exemplary architecture of a system for estimating the influence level of a node set, in accordance with an embodiment of the present invention.

FIG. 2 presents a diagram illustrating an exemplary architecture of a system for estimating the influence level of a node set, in accordance with an embodiment of the present invention. In FIG. 2, influence-estimation system 200 includes a network graph analyzer 202, a node characteristics predictor 204, and an influence estimator 206.

During operation, network graph analyzer 202 analyzes the network graph to obtain network structural information associated with each node in the node set, and the outreach ability of the node set. In some embodiments, the network structural information associated with a node includes, but is not limited to: a degree-centrality level, a betweenness-centrality level, and a closeness-centrality level. Network graph analyzer 202 can also obtain other types of centrality measures while analyzing the network graph. In some embodiments, network graph analyzer 202 also constructs high-level aggregates for the obtained structural information. For example, based on the obtained degree-centrality level for each node, network graph analyzer 202 can compute a histogram of degree-centrality or an average degree-centrality for the node set. Similarly, network graph analyzer 202 can compute a histogram of betweenness-centrality for the node set. The outreach ability of the node set can be calculated as the number of nodes that are directly linked by nodes in the set but are not in the set. In some embodiments, the outreach ability is normalized against the count of nodes in the entire network.

Node characteristics predictor 204 is responsible for predicting the characteristics associated with each node, i.e., the corresponding individual. In some embodiments, the characteristics of an individual can be predicted based on user activity data, such as text, social, and behavioral data collected from their respective sources. For example, the system can collect social data associated with a user based on the user's interactions with other users on social networking sites, and can collect text data associated with the user based on the composition of his emails or online postings. In some embodiments, node characteristics predictor 204 uses various machine-learning techniques, such as decision tree learning, support vector machines (SVM), and Bayes networks, to predict the node's characteristics. In a further embodiment, node characteristics predictor 204 can be trained offline. For example, the system can send a survey of personality traits to a number of users, or have the users complete a web-based (or other type of) survey to provide their demographic and personality information. The users rate themselves on a scale with respect to the personality traits. The system may also compute relative, scaled measurements of the surveyed population's personality traits. While training node characteristics predictor 204, the system collects users' activity data, and trains node characteristics predictor 204 using personality trait measurements from the survey results and the collected user activity data. After node characteristics predictor 204 is trained, it can analyze the collected activity data of other users, and estimate the characteristics of the other users. In some embodiments, node characteristics predictor 204 outputs the characteristics of a node (or a corresponding individual) as Big Five personality traits. In some embodiments, node characteristics predictor 204 can apply a deep learning algorithm to estimate a user's characteristics. More specifically, various types of information associated with the person, such as text information (information related to a user's choice of names (e.g., username, email address, or game character name), writing style (e.g., email writing), and other textual data entered by (and/or otherwise associated with) the user); social networking information (information related to the user's online interaction and connections with other people); and behavior information (information related to any other online actions, properties, and possessions associated with the user), are needed as inputs for constructing a neural network with deep layers, with each layer representing a different level of concept. The higher-level concepts are defined from the lower-level concepts. In addition to predicting characteristics for each individual node, node characteristics predictor 204 can calculate a high-level aggregate of the characteristics of the entire node set. For example, node characteristics predictor 204 can calculate the average extraversion score or openness score for a set of nodes based on individual extraversion and openness scores.

Network graph analyzer 202 can output the aggregated centrality measures and the outreach ability associated with the node set to influence estimator 206. Similarly, node characteristics predictor 204 outputs the aggregated characteristics for the node set to influence estimator 206. Influence estimator 206 is responsible for estimating the influence level of the node set based on the aggregated centrality measure, the outreach ability (which can be normalized against the node count in the network and can be assigned a weight), and the aggregated characteristics for the node set. In some embodiments, the aggregated centrality measure of a node set includes the average betweenness-centrality and the average openness-centrality, and the aggregated characteristics of a node set include the average extraversion score and the average openness score.

Figure 3:
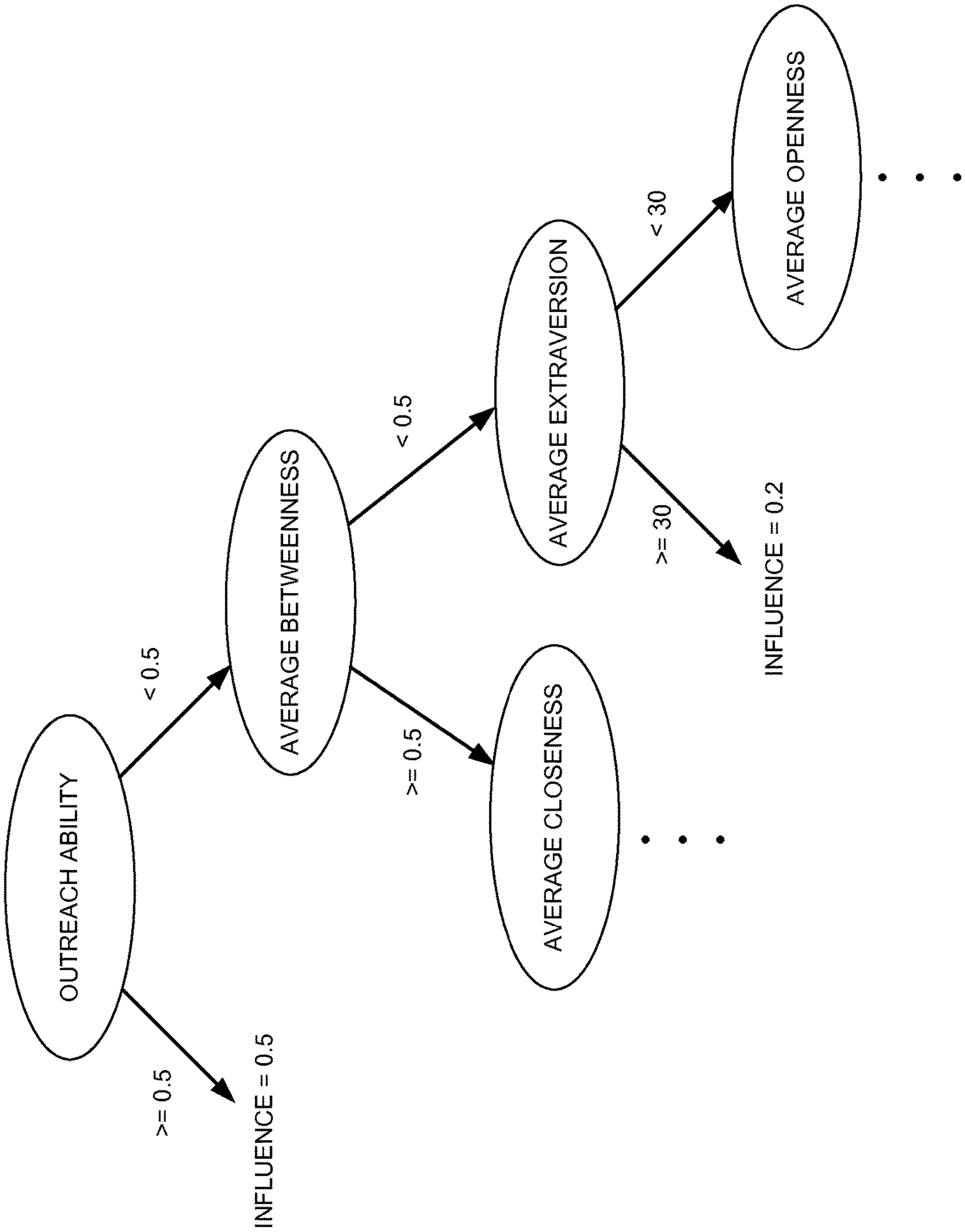
FIG. 3 presents a diagram illustrating an exemplary decision tree for estimating influence, in accordance with an embodiment of the present invention.

In some embodiments, influence estimator 206 estimates the influence of a node set as the weighted sum of the average betweenness-centrality, the average openness-centrality, the normalized outreach ability, the average extraversion score, and the average openness score. For example, influence estimator 206 may estimate influence of the node set using formula (1). In some embodiments, influence estimator 206 applies a decision tree (which can be designed by an expert) when estimating the influence level. FIG. 3 presents a diagram illustrating an exemplary decision tree for estimating influence, in accordance with an embodiment of the present invention. In the example shown in FIG. 3, decision tree 300 starts with the outreach ability of a node set. If the outreach ability is greater than or equal to 0.5, the influence estimator may output the influence as a value of 0.5; otherwise, the decision tree moves down to the next level, and outputs influence values based on other additional measures, such as the average betweenness-centrality, the average closeness-centrality, the average extraversion score, and the average openness score, associated with the node set.

In some embodiments, influence estimator 206 estimates the influence of a node set by applying a machine-learning method. More specifically, influence estimator 206 can learn an influence function that maps the aggregated centrality measures, the outreach ability, and the aggregated node characteristics to an influence value. For example, the system can carry out a marketing campaign multiple times and use the initial targeted node sets and the final active node sets as training instances to train influence estimator 206. In some embodiments, the system builds a regression model based on the structural, outreach, and characteristics information associated with the initial node sets and the number of active nodes at the end. Once trained, influence estimator 206 is capable of estimating the influence of any node set, given that the structural, outreach, and characteristics information associated with the node set are known.

Note that, compared with conventional approaches that are computationally expensive, the various influence-estimation strategies used by embodiments of the present invention do not require prior knowledge of certain network parameters, such as the influence threshold or weight (for the linear threshold model), or the activation probability (for the independent cascade model); and can compute influence efficiently for a large node set.

Figure 4:
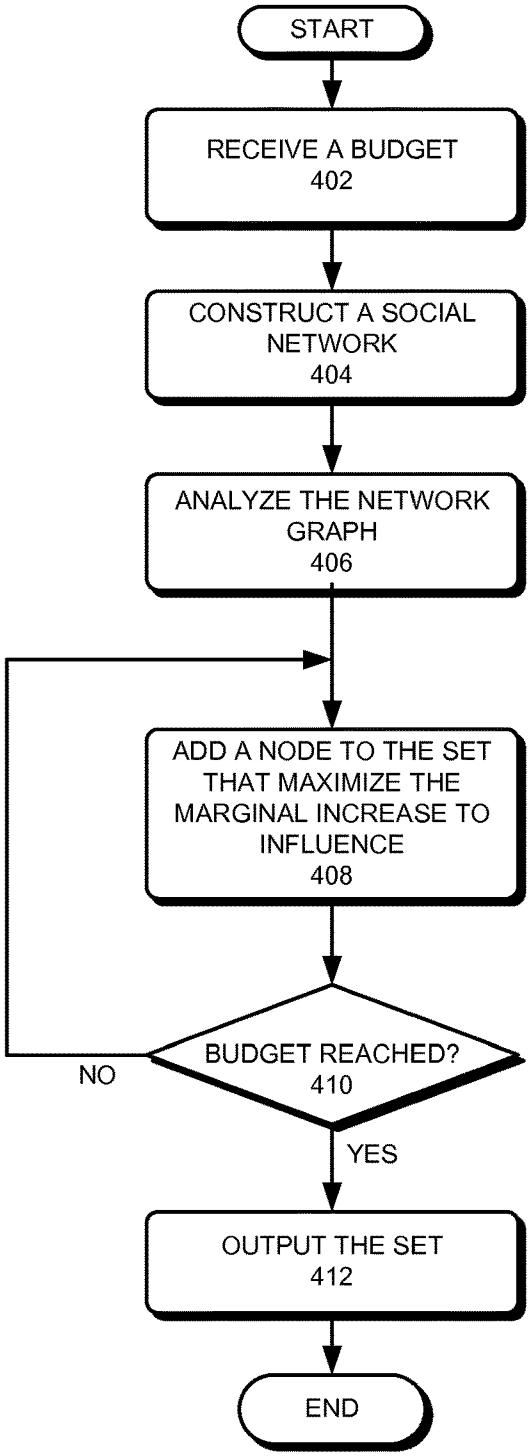
FIG. 4 presents a flowchart illustrating the process of selecting a set of nodes to maximize the spread of information under a budget, in accordance with an embodiment of the present invention.

Equipped with the tool for estimating influence, one can then select a final set of nodes that can maximize the spread of information under the budget constraint. In some embodiments, the system performs a greedy selection process. FIG. 4 presents a flowchart illustrating the process of selecting a set of nodes to maximize the spread of information under a budget, in accordance with an embodiment of the present invention.

During operation, the system receives a budget for spreading information within a population sample (operation 402). Note that the budget can be an amount money paid for delivering information to individuals or the number of hours an expert spends on analyzing security risks associated with those individuals. The system then constructs a social network for the population sample and obtains a network graph (operation 404). The system analyzes the network graph to obtain structural information and characteristics associated with each node (operation 406). Note that the structural information associated with a node may include various centrality measures (such as betweenness-centrality and closeness-centrality) and outreach ability. Examples of characteristics associated with a node can include Big Five personality traits associated with the corresponding individual.

Starting from an empty initial set, the system adds a node into the set that maximizes the marginal increase to the total influence level of the set (operation 408). In some embodiments, to select a node that can maximize the marginal increase to the influence level, the system may select a node, add the selected node to the existing set, estimate the influence level for the new set, and iterate this process for all nodes in the network until a node that maximizes the influence gain is found. In some embodiments, an accelerated process can be used where only nodes with certain structural properties or characteristics are considered. For example, when adding a new node, the system may only consider nodes that have extraversion scores above a predetermined value or nodes that have betweenness-centrality above a predetermined level. In some embodiments, the system estimates influence level for a node set based on formula (1). In some embodiments, the system estimates influence level by performing a machine-learning technique.

Subsequently, the system determines whether the budget has been reached (operation 410). If so, the system outputs the selected node set (operation 412). If not, the system continues to add a new node to the set that can maximize the marginal increase to the influence level (operation 408).

Figure 5:
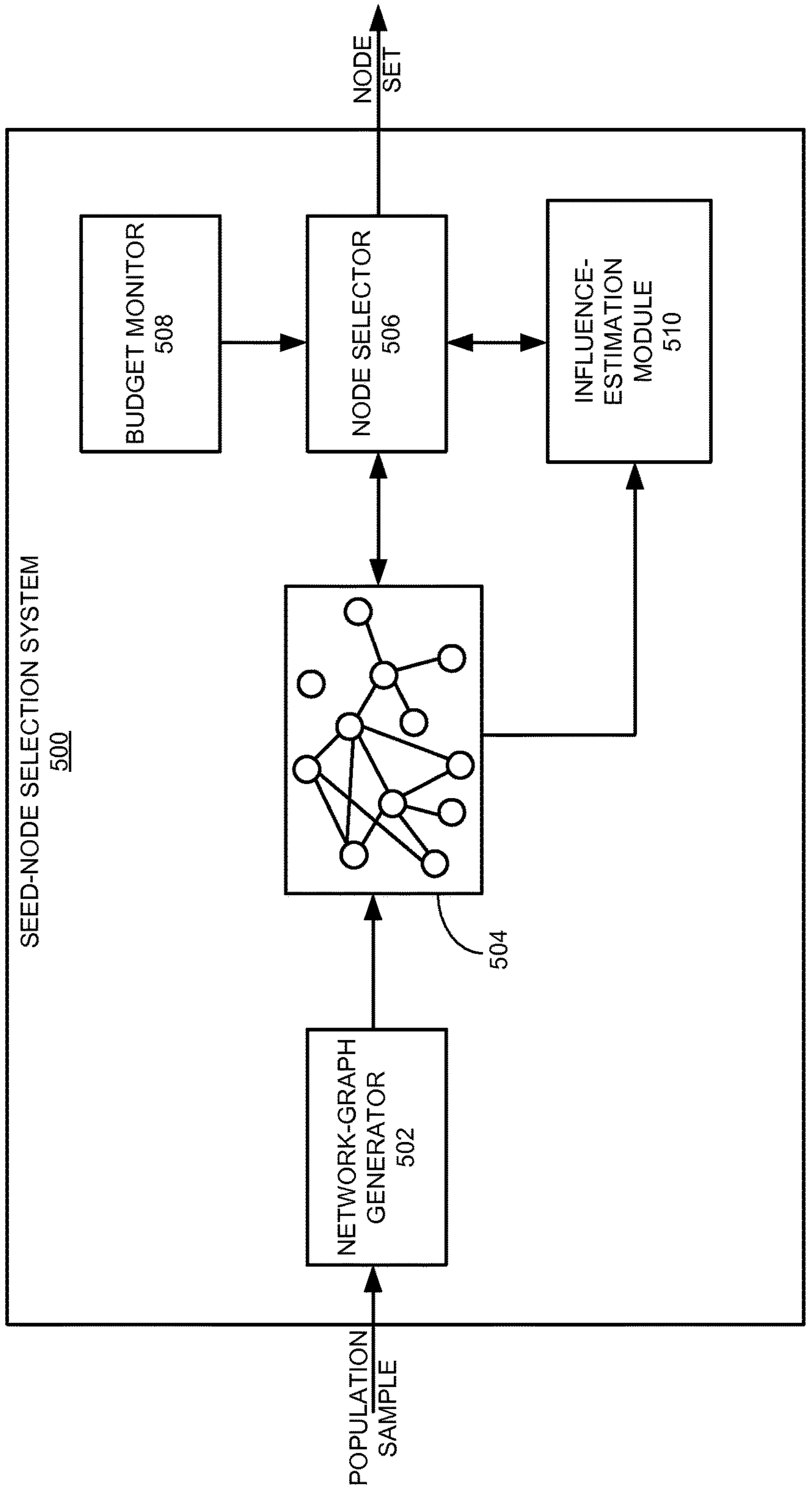
FIG. 5 presents a diagram illustrating a system for selecting a seed-node set to maximize information spreading, in accordance with an embodiment of the present invention.

FIG. 5 presents a diagram illustrating a system for selecting a seed-node set to maximize information spreading, in accordance with an embodiment of the present invention. Seed-node selection system 500 includes a network-graph generator 502, a network graph 504, a node selector 506, a budget monitor 508, and an influence-estimation module 510.

Network-graph generator 502 is responsible for generating network graph 504 for a population sample to which the information is spread. In some embodiments, network-graph generator 502 can gather online information (such as social-networking, online gaming, email correspondence, etc.) and offline information (such as residence, job affiliation, frequently visited venues, etc.) associated with individuals in the population sample to construct network graph 504. Nodes within network graph 504 represent individuals, and edges in network graph 504 represent detected relationships among the individuals.

Node selector 506 is responsible for selecting a set of seed nodes that can maximize the spread of information under a budget constraint. Influence-estimation module 510 is responsible for estimating the influence level of a set of nodes selected by node selector 506. In some embodiments, node selector 506 performs a greedy selection process by interacting with influence-estimation module 510. More specifically, each time node selector 506 adds a node into the selected node set, influence-estimation module 510 estimates the influence level of the new set to ensure that the added node brings a maximum marginal increase to the influence level. In some embodiments, influence-estimation module 510 estimates the influence level of a node set based on the structural information and characteristics associated with nodes within the node set. The structural information can include centrality measures and outreach ability. The characteristics of the nodes can include Big Five personality traits. In some embodiments, a machine-learning technique can be used to estimate the influence level of a set of nodes. Budget monitor 508 monitors the total expense to ensure that the selected final set of seed nodes meets the budget requirements. For example, if the budget for delivering an advertisement is $10,000, and the price tag for delivering the advertisement to an individual is $10; then the total number of selected seed nodes should be less than or equal to 1000 to meet the budget requirements.

Security Analysis

In addition to maximizing the spread of information, solutions provided by embodiments of the present invention can also be used by security analysts when analyzing the security risk of an organization. For example, security analysts may be called to analyze a security situation within a large organization to prevent possible security breaches, such as leaking of sensitive information. A conventional approach is to perform a security check on each individual employee within the organization in order to identify individuals at risk of committing a security breach. However, such an approach may not be economically or timely feasible considering that the organization may have thousands or tens of thousands of employees. Given that there are only a limited number of hours that the analysts may spend on performing security checks, what is needed is a solution that can maximize the risk-reducing effects of such security checks.

Note that security accident may affect different individuals at different levels. For example, when a security breach happens within an organization, an extraverted, well-connected (i.e., having many friends) individual within the organization may be more likely to be exposed to traces of the security breach. In addition, such an individual is more likely to spread a security breach, such as leaking sensitive information or sentiments of discontent, among others inside the organization. Hence, spending time to perform a security check on such an individual can reduce security risks more effectively than spending time to perform a security check on an individual who is less likely to be exposed to or spread a security breach. In other words, a security breach can be viewed as a virus, and an effective security check is to find individuals within the organization who are more likely to be exposed to or to spread the virus to others. Once such individuals are identified, certain security procedures, such as additional training and monitoring, can be performed to prevent the spread of possible security breaches. In some embodiments of the present invention, given a security budget, of either an amount of money or a number of person hours, the system identifies a set of key individuals as security-check targets in order to maximize the reduction in security risks.

The process for selecting the security-check targets is similar to the one shown in FIG. 4, except that, when security is concerned, the influence of an individual node may be defined differently compared with the influence used in the example of information spreading. In some embodiments, security experts can define what "influence" is for a specific domain. For example, the influence level can be defined as the number of individuals involved in a security breach. For example, if the security breach involves leakage of sensitive information, the influence level may be defined as the number of individuals who are also exposed to the leaked information. Similarly, if the security breach involves a sentiment of discontent, the influence level may be defined as the number of individuals who are affected by the discontented sentiment. In some embodiments, when selecting security-check targets, the system can analyze the influence level of the selected set of nodes based on the network structural information and characteristics associated with the nodes. The structural information of a node set may include various aggregated centrality measures as well as outreach abilities of the set of nodes. The characteristics of a node may include Big Five personality traits associated with the individual. In some embodiments, the system can use formula (1) to estimate the influence level of a node set. In some embodiments, the system may use a different formula or apply a set of rules defined by security experts to estimate the influence level. In some embodiments, the system can apply a machine-learning algorithm and trains an influence-estimator based on user surveys.

Similar to the example of information spreading, the system for selecting the security-check targets performs a greedy selection process to add one node at a time, and each added node is selected to maximize the marginal gain of the influence level.

Computer System

Figure 6:
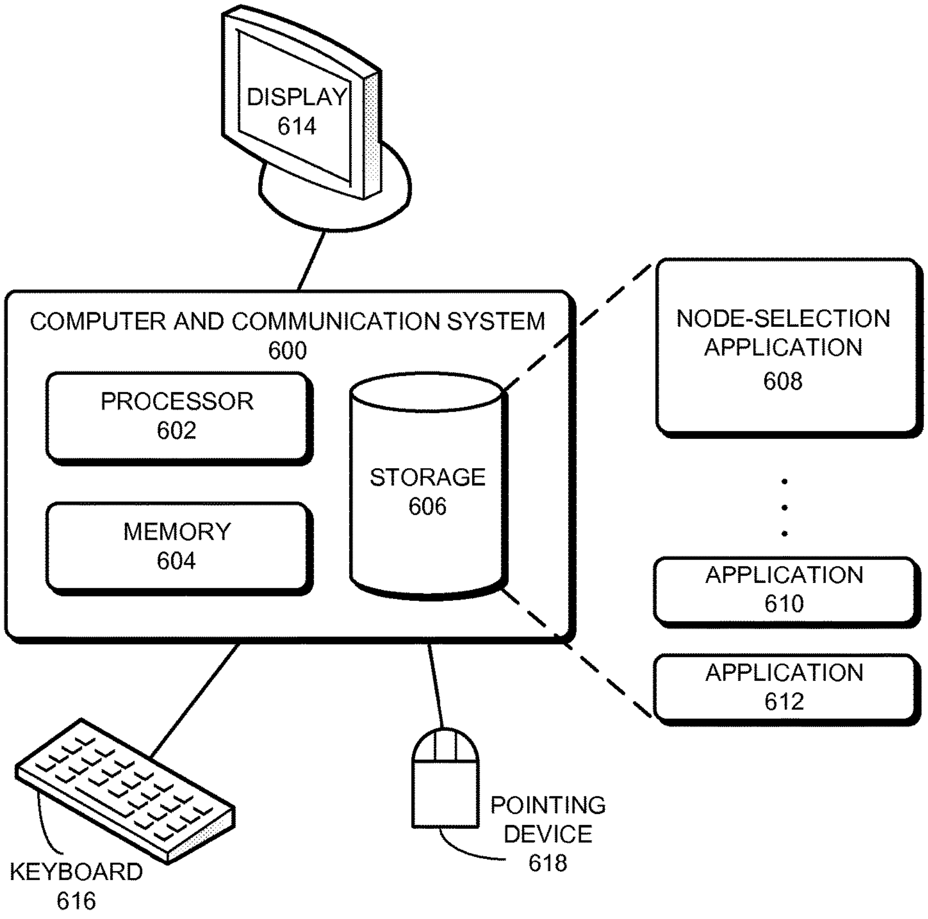
FIG. 6 illustrates an exemplary computer system for selecting a node set to maximize information spreading in a social network, in accordance with one embodiment of the present invention In the figures, like reference numerals refer to the same figure elements.

FIG. 6 illustrates an exemplary computer system for selecting a node set to maximize information spreading in a social network, in accordance with one embodiment of the present invention. In one embodiment, a computer and communication system 600 includes a processor 602, a memory 604, and a storage device 606. Storage device 606 stores a node-selection application 608, as well as other applications, such as applications 610 and 612. During operation, node-selection application 608 is loaded from storage device 606 into memory 604 and then executed by processor 602. While executing the program, processor 602 performs the aforementioned functions. Computer and communication system 600 is coupled to an optional display 614, keyboard 616, and pointing device 618.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for delivering a message under a budget constraint, the method comprising:

receiving a population sample;

collecting data of online activities performed by users within the population sample;

constructing, by a server, a social network associated with the population sample based on the collected data, wherein the social network comprises a plurality of nodes, and wherein constructing the social network comprises applying a set of predetermined heuristic rules to the collected online activity data;

analyzing, by the server, a network graph associated with the social network to obtain structural information associated with a respective node within the social network;

determining, by the server, based on a Big-Five model and online activity data of a user associated with the node, a five-dimension vector that reflects personality traits of the user;

computing, by the server, an influence level of the node based on a combination of the structural information associated with the node and the five-dimension vector that reflects the personality traits of the user, wherein computing the influence level comprises applying a decision tree that is constructed based on the combination of the structural information and the five-dimension vector thereby enhancing an efficiency for computing the influence level;

identifying a set of nodes that maximizes the information spreading under the budget constraint based on computed influence levels of nodes within the social network; and delivering, by the server over a computer network, the message to users associated with the set of identified nodes.

2. The method of claim 1, wherein the structural information associated with the node includes centrality measures and an outreach ability, and wherein the centrality measures include one or more of: a degree-centrality measure, a betweenness-centrality measure, and a closeness-centrality measure.

3. The method of claim 1, wherein identifying the set of nodes involves:

estimating an influence level associated with an initial node set; and performing a greedy selection process to identify a node that maximizes a marginal gain of influence level to the initial node set.

4. The method of claim 3, where estimating the influence level associated with the initial node set involves:

calculating a weighted sum of aggregated centrality measures associated with nodes within the initial node set;

calculating an outreach ability of the initial node set; and calculating a weighted sum of aggregated characteristics associated with nodes within the initial node set.

5. The method of claim 3, wherein estimating the influence level associated with the initial node set involves applying a machine-learning technique.

6. The method of claim 3, wherein performing the greedy selection process involves determining whether a node number of the selected set exceeds a threshold determined by the budget constraint, and wherein the budget constraint includes one of: an amount of money, and a number of person hours.

7. A non-transitory computer-readable storage medium storing instructions that when executed by a computer cause the computer to perform a method for delivering a message under a budget constraint, the method comprising:

receiving a population sample;

collecting data of online activities performed by users within the population sample;

constructing a social network associated with the population sample based on the collected data, wherein the social network comprises a plurality of nodes, and wherein constructing the social network comprises applying a set of predetermined heuristic rules to the collected online activity data;

analyzing a network graph associated with the social network to obtain structural information associated with a respective node within the social network;

determining, based on a Big-Five model and online activity data of a user associated with the node, a five-dimension vector that reflects personality traits of a user associated with the node;

computing an influence level of the node based on a combination of the structural information associated with the node and the five-dimension vector that reflects the personality traits of the user, wherein computing the influence level comprises applying a decision tree that is constructed based on the combination of the structural information and the five-dimension vector, thereby enhancing an efficiency for computing the influence level;

identifying a set of nodes that maximizes the information spreading under the budget constraint based on computed influence levels of nodes within the social network; and delivering, over a computer network, the message to users associated with the set of identified nodes.

8. The computer-readable storage medium of claim 7, wherein the structural information associated with the node includes centrality measures and an outreach ability, and wherein the centrality measures include one or more of: a degree-centrality measure, a betweenness-centrality measure, and a closeness-centrality measure.

9. The computer-readable storage medium of claim 7, wherein identifying the set of nodes involves:

estimating an influence level associated with an initial node set; and performing a greedy selection process to identify a node that maximizes a marginal gain of influence level to the initial node set.

10. The computer-readable storage medium of claim 9, wherein estimating the influence level associated with the initial node set involves:

calculating a weighted sum of aggregated centrality measures associated with nodes within the initial node set;

calculating an outreach ability of the initial node set; and calculating a weighted sum of aggregated characteristics associated with nodes within the initial node set.

11. The computer-readable storage medium of claim 9, wherein estimating the influence level associated with the initial node set involves applying a machine-learning technique.

12. The computer-readable storage medium of claim 9, wherein performing the greedy selection process involves determining whether a node number of the selected set exceeds a threshold determined by the budget constraint, and wherein the budget constraint includes one of: an amount of money, and a number of person hours.

13. A computer system for delivering a message under a budget constraint, comprising:

a processor; and a memory coupled to the processor, wherein the memory stores a set of instructions that when executed by a computer cause the computer to perform a method, wherein the method comprises:

receiving a population sample;

collecting data of online activities performed by users within the population sample;

constructing a social network associated with the population sample based on the collected data, wherein the social network comprises a plurality of nodes, and wherein constructing the social network comprises applying a set of predetermined heuristic rules to the collected online activity data;

analyzing a network graph associated with the social network to obtain structural information associated with a respective node within the social network;

determining, based on a Big-Five model and online activity data of a user associated with the node, a five-dimension vector that reflects personality traits of a user associated with the node;

computing an influence level of the node based on a combination of the structural information associated with the node and the five-dimension vector that reflects the personality traits of the user, wherein computing the influence level comprises applying a decision tree that is constructed based on the combination of the structural information and the five-dimension vector, thereby enhancing an efficiency for computing the influence level;

identifying a set of nodes that maximizes the information spreading under the budget constraint computed influence levels of nodes within the social network; and delivering, over a computer network, the message to users associated with the set of identified nodes.

14. The computer system of claim 13, wherein the structural information associated with the node includes centrality measures and an outreach ability, and wherein the centrality measures include one or more of: a degree-centrality measure, a betweenness-centrality measure, and a closeness-centrality measure.

15. The computer system of claim 13, wherein identifying the set of nodes involves:

estimating an influence level associated with an initial node set; and performing a greedy selection process to identify a node that maximizes a marginal gain of influence level to the initial node set.

16. The computer system of claim 15, wherein estimating the influence level associated with the initial node set involves:

calculating a weighted sum of aggregated centrality measures associated with nodes within the initial node set;

calculating an outreach ability of the initial node set; and calculating a weighted sum of aggregated characteristics associated with nodes within the initial node set.

17. The computer system of claim 15, wherein estimating the influence level associated with the initial node set involves applying a machine-learning technique.

18. The computer system of claim 15, wherein performing the greedy selection process involves determining whether a node number of the selected set exceeds a threshold determined by the budget constraint, and wherein the budget constraint includes one of: an amount of money, and a number of person hour.

* * * * *